United States Patent
Liang et al.

(10) Patent No.: US 8,018,174 B2
(45) Date of Patent: Sep. 13, 2011

(54) SAFETY CIRCUIT FOR ELECTRO-LUMINESCENT LAMP BALLAST

(75) Inventors: Chih-Ping Liang, Hsinchu (TW); Chang-Yi Liu, Changhua County (TW)

(73) Assignee: Ceelite LLC, Blue Bell, PA (US)

( * ) Notice: Subject to any disclaimer, the term of this patent is extended or adjusted under 35 U.S.C. 154(b) by 478 days.

(21) Appl. No.: 12/313,669

(22) Filed: Nov. 20, 2008

(65) Prior Publication Data

US 2009/0146574 A1    Jun. 11, 2009

Related U.S. Application Data

(63) Continuation of application No. 11/727,276, filed on Mar. 26, 2007, now abandoned.

(60) Provisional application No. 60/787,533, filed on Mar. 31, 2006.

(51) Int. Cl.
*H05B 37/00* (2006.01)

(52) U.S. Cl. ........ 315/224; 315/125; 315/225; 315/307; 315/DIG. 7

(58) Field of Classification Search .................. 315/119, 315/123–125, 127, 224–25, 291, 307, DIG. 5, 315/DIG. 7
See application file for complete search history.

(56) References Cited

U.S. PATENT DOCUMENTS

| 5,574,336 | A  | * | 11/1996 | Konopka et al. | ............... 315/225 |
| 7,378,806 | B2 | * | 5/2008  | Nerone         | ......................... 315/291 |

* cited by examiner

*Primary Examiner* — David Hung Vu
(74) *Attorney, Agent, or Firm* — Connolly Bove Lodge & Hutz LLP

(57) ABSTRACT

A safety circuit is provided for a ballast of an electro-luminescent (EL) lamp. The EL lamp had an electrical ground shield on at least a portion thereof and has a separate ground lead. The ballast is an isolated ballast with a line input being isolated from an output. The ballast is constructed and arranged to be electrically connected with the separate ground lead. The circuit includes a current sensing structure constructed and arranged to connect between the separate ground lead and a potential ground of the ballast. In the event a user contacts the EL lamp to replace the EL lamp or contacts a defective EL lamp, the ballast is shut down based on a value of current sensed by the current sensing structure.

21 Claims, 1 Drawing Sheet

SAFETY CIRCUIT FOR ELECTRO-LUMINESCENT LAMP BALLAST

CROSS-REFERENCE TO RELATED APPLICATION

This application is a continuation of U.S. patent application Ser. No. 11/727,276, filed Mar. 26, 2007, now abandoned which claims the benefit of the earlier filing date of U.S. Provisional Application No. 60/787,533, filed on Mar. 31, 2006, each of which is incorporated by reference herein in its respective entirety.

FIELD OF THE INVENTION

The invention relates to Electro-luminescent (EL) lamps and, more particularly, to a safety circuit, for an EL lamp system, herein called Smart Faults Detection and Protection (SFD&P).

BACKGROUND OF THE INVENTION

Typical EL lamps are applied in frame systems. Thus, the size of the EL lamp can be 2,500 square inches or more and the applied voltage can be between 100-350 VAC or even higher. If people touch the electrode of EL lamp, current may flow through the human body to ground, thus possibly causing physical injury.

It has long been known to apply a Ground Fault Interrupt (GFI) circuit to the ballast for fluorescent lamps. A conventional GFI circuit uses a current sensor to measure unbalanced current between input live and neutral. Most of the ballasts are non-isolated circuits. These GFI circuits can be applied to the non-isolated ballast for an EL lamp. Thus, when a person touches the electrode of EL lamp, the conventional GFI circuit will shut down the ballast. However, when EL lamp is put into a grounded lighting frame or fixture, there is a large parasitic capacitance (a few nF) between the fixture and EL lamp, thus resulting in high leakage current from the EL lamp to ground. This stray leakage current will trip the GFI circuit and shut down the ballast. Hence, the conventional GFI circuits cannot accurately discriminate between stray leakage current and the leakage current that occurs due to a true fault condition.

In an isolated ballast, line input is isolated from an output high voltage terminal. Thus, an isolated ballast could prevent stray leakage current flow to a grounded fixture since there is no return current path back to a secondary of the ballast. An isolated ballast with a GFI circuit could detect leakage current when a person touches the electrode of an EL lamp. However, when a person replaces an EL lamp, if the lighting fixture of the EL lamp is floating, there is still a leakage current coupled to the lighting fixture which can flow to the human body and back to ballast secondary output. The magnitude of the coupled leakage current depends on parasitic capacitance between the El lamp and the fixture, and at times can be up to 10 mA. Thus, even with an isolated ballast, there is still a risk of getting shocked when replacing such an EL lamp.

An EL lamp with a ground shield and an isolated ballast could solve the above-mentioned problem, since there is no parasitic capacitance from the EL lamp to the lighting fixture. However, if an isolated ballast is connected with a ground shield of the EL lamp and if the EL lamp is destroyed by a metal tip, if a person touches the defective part, leakage current will flow through the human body to the ground shield and couple back to the EL lamp. This shock current could be as high as 60 mA and depends on the parasitic capacitance between the ground shield and the rear electrode of EL lamp.

Thus, there is a need to provide a new safety circuit for an EL lamp to protect a user when replacing an EL lamp and when touching a defective EL lamp.

SUMMARY OF THE INVENTION

An object of the invention is to fulfill the need referred to above. In accordance with the principles of the present invention, this objective is obtained by providing a safety circuit for a ballast of an electro-luminescent (EL) lamp. The EL lamp had an electrical ground shield on at least a portion thereof and has a separate ground lead. The ballast is an isolated ballast with a line input being isolated from an output. The ballast is constructed and arranged to be electrically connected with the separate ground lead. The circuit includes a current sensing structure constructed and arranged to connect between the separate ground lead and a potential ground of the ballast. In the event a user contacts the EL lamp to replace the EL lamp or contacts a defective EL lamp, the ballast is shut down based on a value of current sensed by the current sensing structure.

In accordance with another aspect of the invention, a method is provided for controlling a ballast for powering an electro-luminescent (EL) lamp. The ballast has a line input isolated from an output. The method provides an EL lamp having an electrical ground shield on at least a portion thereof and having a separate ground lead. The ballast is electrically connected with the separate ground lead. Current between the separate ground lead and a potential ground of the ballast is sensed. The ballast is shut down based on a value of current sensed by the current sensing structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing in which.

DETAILED DESCRIPTION OF THE EXEMPLARY EMBODIMENT

Figure 1:
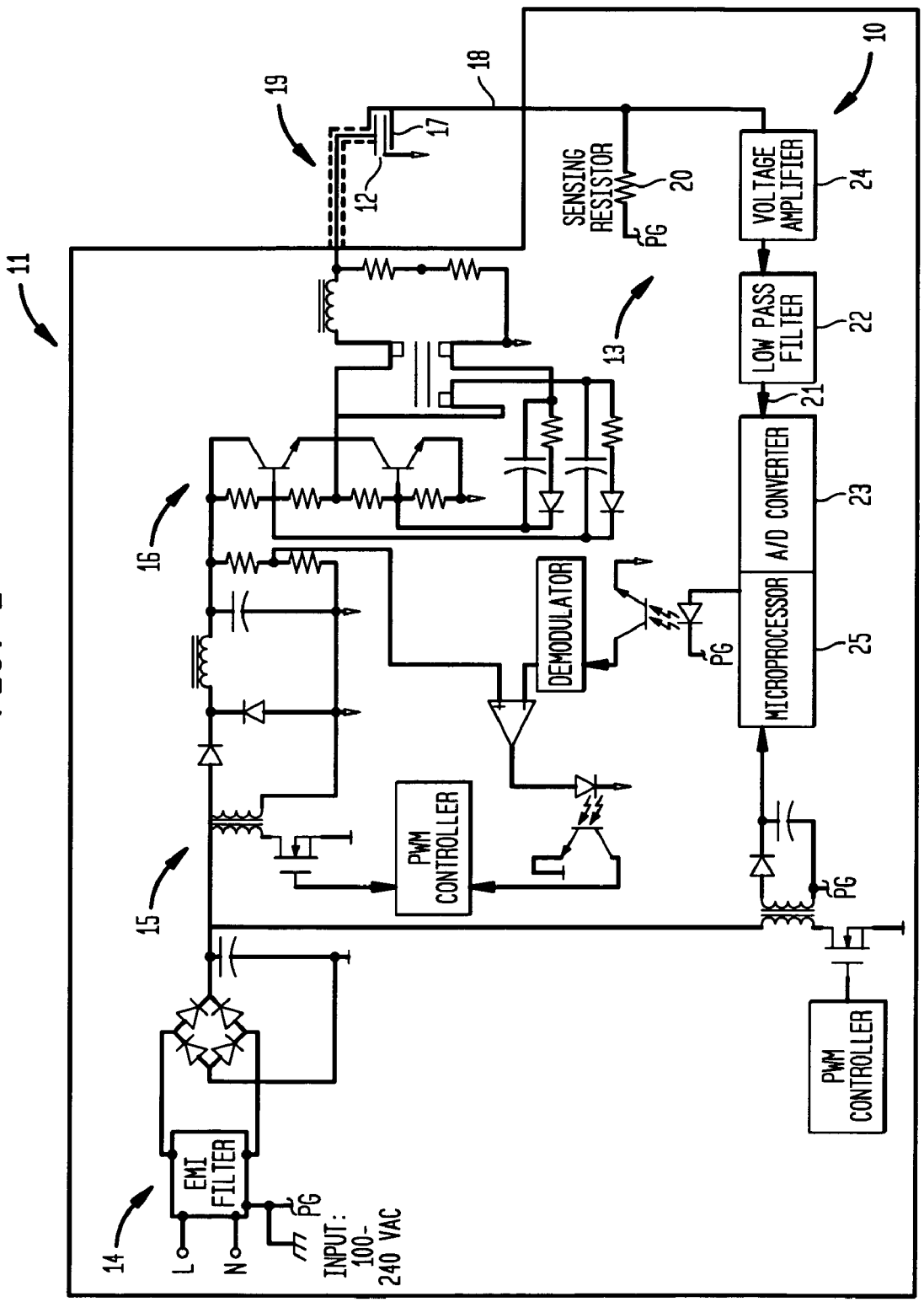
FIG. 1 is a schematic of an EL lamp system including a ballast having a safety circuit, provided in accordance with the principles of an embodiment of the invention.

With reference to FIG. 1, a safety circuit, generally indicated at 10, for an EL lamp ballast, generally indicated at 11, is shown in accordance with the principles of the present invention. The ballast 11 is an isolated ballast with a line input being isolated from an output. The ballast 11 powers an EL lamp 12 having a ground shield. The safety circuit includes a Smart Faults Detection and Protection (SFD&P) circuit, generally indicated at 13. The ballast 11, with the SFD&P circuit 13, together with the EL lamp 12 defines an EL lamp system 19.

In the embodiment, the isolated ballast 11 includes a three-wire input, generally indicated at 14, an isolated AC-DC converter, generally indicated at 15, and a DC-AC inverter, generally indicated at 16, providing AC current to the EL lamp 12.

Preferably, an aluminum foil 17 is laminated on at least a portion of a rear side of the EL lamp 12 and a separate ground lead 18 is electrically connected to the SFD&P circuit 13. More particularly, in the embodiment, the SFD&P circuit 13 includes a current sensing structure, preferably in the form of a resistor 20 (e.g., a few ohms), placed between the separate ground lead 18 and potential ground (PG) of the ballast 11.

When a person or user touches the electrode of the EL lamp 12 or fixture of the EL lamp, the leakage current will flow through human body to the ground lead 18 to the current sensing resistor 20. Since the voltage drop is low, an active rectifier 22 and an amplifier 24 are connected to the sensing resistor 20 providing an amplified signal 21. The voltage drop (signal 21) of the sensing resistor 20 is preferably measured by an analog to digital converter 23 and a controller 25, such as a microprocessor. The converter 23 can be part of the controller 25. The controller 25 will shut down the ballast 11 when current sensed by the sensing resistor 20 exceeds a trip or threshold value of current. Instead of using the microprocessor 25, a trip latch circuit can be connected to the amplifier to shut down the ballast 11 when a leakage current flow to a person is measured.

Thus, it can be appreciated that the safety circuit 10 protects a user when replacing an EL lamp and when touching a defective EL lamp.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A safety circuit for a ballast of an electro-luminescent (EL) lamp, the EL lamp having an electrical ground shield on at least a portion thereof and a separate ground lead, the ballast isolated ballast with a line input being isolated from an output, the ballast being constructed and arranged to be electrically connected with the separate ground lead, the circuit comprising:
    a current sensing structure constructed and arranged to connect between the separate ground lead and a potential ground of the ballast; and
    means for shutting down the ballast based on a value of current sensed by the current sensing structure.

2. The circuit of claim 1, wherein the current sensing structure is a resistor.

3. The circuit of claim 1, further including a filter and an amplifier electrically coupled with the current sensing structure providing an amplified signal to the means for shutting down.

4. The circuit of claim 3, wherein the means for shutting down is a controller.

5. The circuit of claim 4, wherein the controller is a microprocessor, the amplified signal being passed through an analog-to-digital converter prior to being received by the microprocessor.

6. The circuit of claim 1, wherein the means for shutting down is a microprocessor.

7. The circuit of claim 1 in combination with the EL lamp, the ground shield being on a rear portion of the EL lamp.

8. The combination of claim 7, wherein the circuit is part of the ballast.

9. An electro-luminescent (EL) lamp system comprising:
    an EL lamp having an electrical ground shield on at least a portion thereof and a having separate ground lead,
    an isolated ballast for powering the EL lamp, the ballast having a line input being isolated from an output, the ballast being electrically connected with the separate ground lead,
    a current sensing structure connected between the separate ground lead and a potential ground of the ballast; and
    means for shutting down the ballast based on a value of current sensed by the current sensing structure.

10. The system of claim 9, wherein the current sensing structure is a resistor.

11. The system of claim 9, further including a filter and an amplifier electrically coupled with the current sensing structure providing an amplified signal to the means for shutting down.

12. The system of claim 11, wherein the means for shutting down is a controller.

13. The system of claim 12, wherein the controller is a microprocessor, the amplified signal being passed through an analog-to-digital converter prior to being received by the microprocessor.

14. The system of claim 9, wherein the means for shutting down is a microprocessor.

15. The system of claim 9, wherein the ground shield is aluminum foil laminated on a rear portion of the EL lamp.

16. A method of controlling a ballast for powering an electro-luminescent (EL) lamp, the ballast having a line input isolated from an output,
    providing an EL lamp having an electrical ground shield on at least a portion thereof and having a separate ground lead, the ballast being electrically connected with the separate ground lead,
    sensing current between the separate ground lead and a potential ground of the ballast; and
    shutting down the ballast based on a value of current sensed by the current sensing structure.

17. The method of claim 16, wherein the step of sensing current includes sensing current when a user contacts the EL lamp.

18. The method of claim 16, wherein the step of shutting down the ballast includes employing a controller to compare the value of current sensed to a threshold value of current.

19. The method of claim 18, wherein the controller is a microprocessor.

20. The method of claim 16, wherein the step of providing the EL lamp includes ensuring that the EL lamp has aluminum foil laminated on a rear portion of the EL lamp defining the ground shield.

21. The method of claim 16, wherein the step of sensing current includes using a resistor.

* * * * *